United States Patent
Wang

(10) Patent No.: US 12,155,609 B2
(45) Date of Patent: Nov. 26, 2024

(54) MESSAGE PROCESSING METHOD AND ELECTRONIC DEVICE

(71) Applicant: VIVO MOBILE COMMUNICATION CO., LTD., Dongguan (CN)

(72) Inventor: Mingfa Wang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/140,970

(22) Filed: Apr. 28, 2023

(65) Prior Publication Data

US 2023/0262013 A1 Aug. 17, 2023

Related U.S. Application Data

(63) Continuation of application No. PCT/CN2021/126046, filed on Oct. 25, 2021.

(30) Foreign Application Priority Data

Oct. 29, 2020 (CN) .......................... 202011179661.7

(51) Int. Cl.
*H04L 51/04* (2022.01)
*G06F 3/04817* (2022.01)
*G06F 3/0488* (2022.01)
*H04L 51/224* (2022.01)

(52) U.S. Cl.
CPC .......... *H04L 51/04* (2013.01); *G06F 3/04817* (2013.01); *G06F 3/0488* (2013.01); *H04L 51/224* (2022.05)

(58) Field of Classification Search
CPC ... H04L 51/04; H04L 51/224; G06F 3/04817; G06F 3/0488
See application file for complete search history.

(56) References Cited

U.S. PATENT DOCUMENTS

| | | | |
|---|---|---|---|
| 2006/0010200 A1 | 1/2006 | Mousseau et al. | |
| 2013/0125062 A1* | 5/2013 | Lee | G06F 3/04883 715/854 |
| 2014/0256295 A1* | 9/2014 | Peng | G06F 3/0486 455/412.2 |
| 2016/0277346 A1* | 9/2016 | Xu | H04M 1/724631 |
| 2017/0357394 A1 | 12/2017 | Jon et al. | |
| 2020/0396191 A1* | 12/2020 | Yang | H04L 51/42 |
| 2023/0012233 A1* | 1/2023 | Luo | H04L 51/234 |
| 2023/0325053 A1* | 10/2023 | Wang | H04L 51/04 715/758 |

FOREIGN PATENT DOCUMENTS

| | | |
|---|---|---|
| CN | 105511856 A | 4/2016 |
| CN | 106775252 A | 5/2017 |
| CN | 106933438 A | 7/2017 |
| CN | 107272996 A | 10/2017 |

(Continued)

*Primary Examiner* — June Sison
(74) *Attorney, Agent, or Firm* — The Webb Law Firm

(57) ABSTRACT

A message processing method includes receiving a first input performed on a target region on a first icon; and displaying a first unread message in response to the first input. The target region includes a corner mark associated with the first unread message, and the first unread message includes at least one unread message of an application program corresponding to the first icon.

15 Claims, 9 Drawing Sheets

(56) References Cited

FOREIGN PATENT DOCUMENTS

| | | | |
|---|---|---|---|
| CN | 108170337 | A | 6/2018 |
| CN | 109725947 | A | 5/2019 |
| CN | 110309003 | A | 10/2019 |
| CN | 110351423 | A | 10/2019 |
| CN | 110888705 | A | 3/2020 |
| CN | 112351142 | A | 2/2021 |
| EP | 2770466 | A1 | 8/2014 |

* cited by examiner

MESSAGE PROCESSING METHOD AND ELECTRONIC DEVICE

CROSS-REFERENCE TO RELATED APPLICATIONS

This application is a Bypass Continuation application of PCT/CN2021/126046 filed Oct. 25, 2021, and claims priority to Chinese Patent Application No. 202011179661.7 filed Oct. 29, 2020, the disclosures of which are hereby incorporated by reference in their entireties.

BACKGROUND OF THE INVENTION

Field of the Invention

The present application belongs to the technical field of communications, and in particular, relates to a message processing method and apparatus and an electronic device.

Description of Related Art

As more and more application programs are installed on electronic devices such as mobile phones, there are also more and more notification messages of corresponding application programs. At present, unread messages are generally displayed in a notification bar. For example, if they are classified according to application programs, unread messages of different application programs are arranged in reverse order from top to bottom, and the sorting of unread messages is simply based on time without priorities.

SUMMARY OF THE INVENTION

According to a first aspect, the embodiments of the present application provide a message processing method, the method including:
  receiving a first input performed on a target region on a first icon;
  where the target region includes a corner mark associated with a first unread message, and the first unread message includes at least one unread message of an application program corresponding to the first icon; and
  displaying the first unread message in response to the first input.

According to a second aspect, the embodiments of the present application provide a message processing apparatus, the apparatus including:
  a first receiving module, configured to receive a first input performed on a target region on a first icon;
  where the target region includes a corner mark associated with a first unread message, and the first unread message includes at least one unread message of an application program corresponding to the first icon; and
  a first response module, configured to display the first unread message in response to the first input.

According to a third aspect, the embodiments of the present application provide an electronic device, where the electronic device includes a processor, a memory, and a program or an instruction stored in the memory and executable on the processor, and when the program or the instruction is executed by the processor, the steps of the method according to the first aspect are implemented.

According to a fourth aspect, the embodiments of the present application provide a non-transitory computer-readable storage medium, where the non-transitory computer-readable storage medium stores a program or an instruction, and when the program or the instruction is executed by a processor, the steps of the method according to the first aspect are implemented.

According to a fifth aspect, the embodiments of the present application provide a chip, where the chip includes a processor and a communications interface, the communications interface is coupled to the processor, and the processor is configured to execute a program or an instruction, to implement the method according to the first aspect.

According to a sixth aspect, the embodiments of this application provide a computer program product stored in a non-volatile storage medium, and the computer program product is executed by at least one processor to implement the method according to the first aspect.

DESCRIPTION OF THE INVENTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art fall within the protection scope of this application.

Terms "first" and "second" in the specification and claims of this application are used to distinguish between similar objects, and are not used to describe a specific order or sequence. It should be understood that the data used in this way is interchangeable in appropriate circumstances so that the embodiments of this application described can be implemented in other orders than the order illustrated or described herein. In addition, in the specification and the claims, "and/or" represents at least one of connected objects, and a character "/" generally represents an "or" relationship between associated objects.

With reference to the accompanying drawings, the following describes the message processing method in the embodiments of this application based on embodiments and application scenarios.

Usually, since unread messages in a notification bar are arranged vertically and are limited by a length of a screen, when users need to view unread messages of an application program, they often need to swipe up and down to find corresponding unread messages, and then view content of the corresponding unread messages by performing a clicking operation. An operation process of this message processing method is cumbersome and cannot quickly locate a specific application program.

Figure 1:
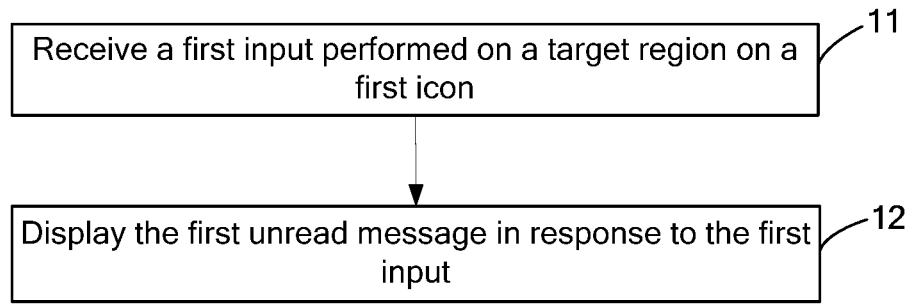
FIG. 1 is a schematic diagram of steps of a message processing method according to an embodiment of the present application.

As shown in FIG. 1, embodiments of the present application provide a message processing method, including:

Step 11: Receive a first input performed on a target region on a first icon.

The target region includes a corner mark associated with a first unread message, and the first unread message includes at least one unread message of an application program corresponding to the first icon.

Step 12: Display the first unread message in response to the first input.

Herein, the first input may be a click input performed on the corner mark on the first icon. After the corner mark of the first icon is clicked, an unread message window pops up. For example, the unread message window may be used to display the first unread message.

Figure 2:
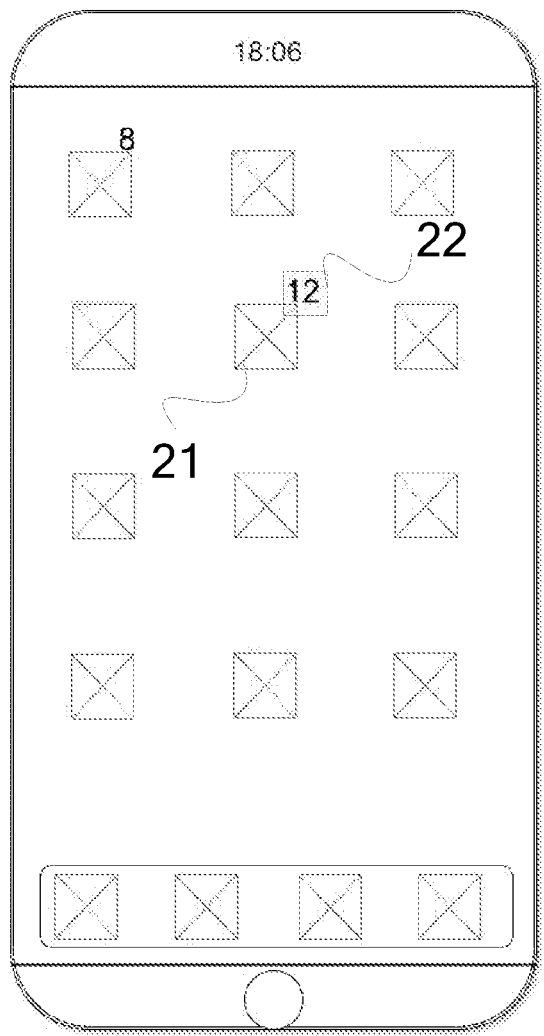
FIG. 2 is a schematic diagram of a display interface of an electronic device according to an embodiment of the present application.

For example, a user clicks a corner mark 22 on a first icon 21 in FIG. 2, and the first icon 21 corresponds to the application program Twitter, that is, the user clicks the corner mark of Twitter. In this case, a message window corresponding to Twitter pops up. Optionally, the message window can be displayed in the form of a floating window, and unread messages corresponding to Twitter can be displayed in the message window in a vertical arrangement. Optionally, the user can also view, reply, and delete unread messages in the message window.

In the embodiments of the present application, the first input performed on the target region that is on the first icon and that includes the corner mark associated with the first unread message is received; and the first unread message is displayed in response to the first input, to quickly view unread messages. In this way, the unread messages are displayed by adding the click interaction on the corner mark of the application program, making the unread message processing easier and faster and improving the efficiency of unread message processing.

Optionally, the displaying the first unread message in response to the first input includes:

displaying the first unread message in a target display mode in response to the first input;

where at least one message window and second icon(s) of at least one application program with unread messages are displayed in the target display mode, a first message window in the at least one message window is used to display the first unread message, and at least one second icon includes the first icon.

Figure 3:
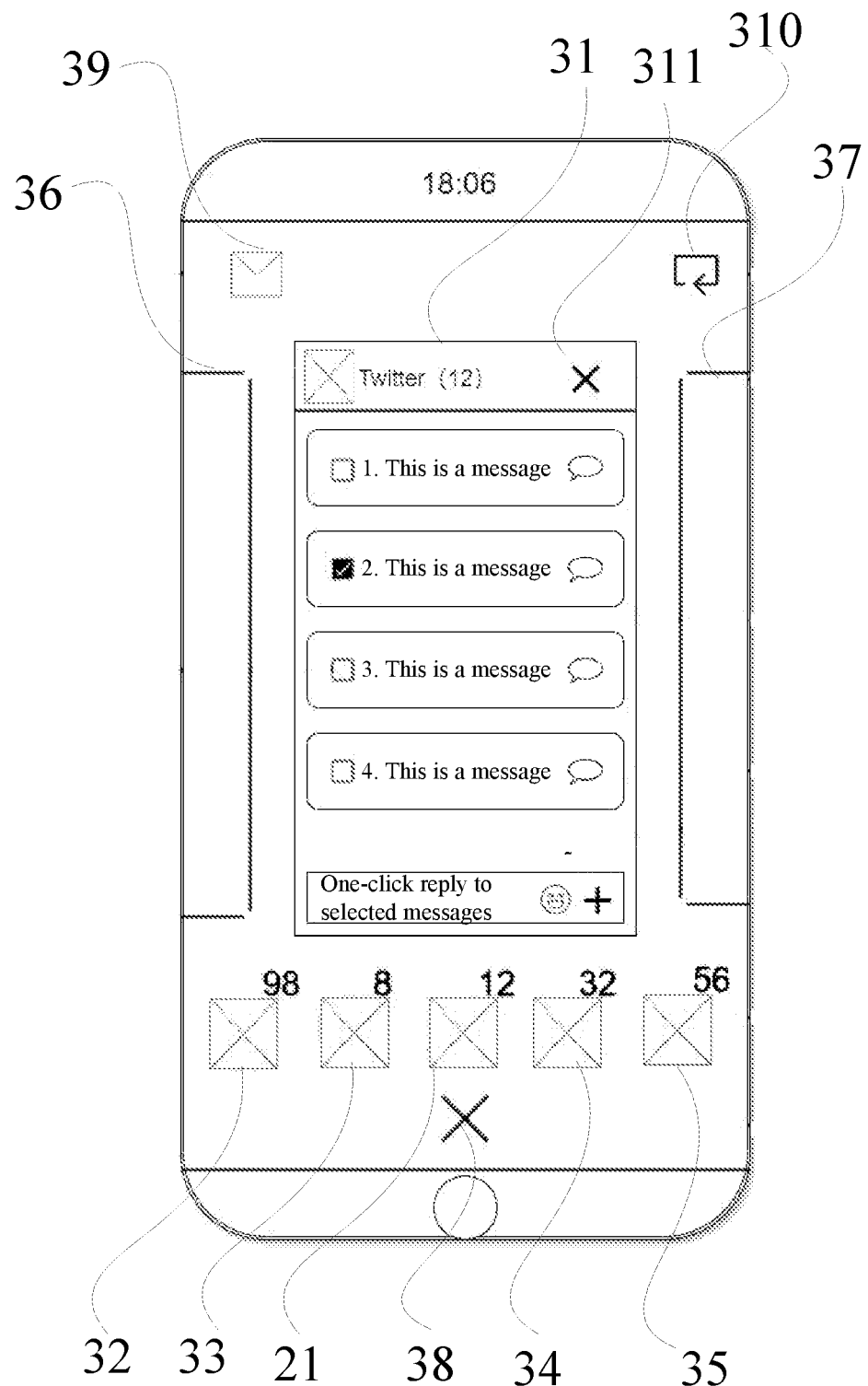
FIG. 3 is a first schematic diagram of an application scenario of a message processing method according to an embodiment of the present application.
Figure 4:
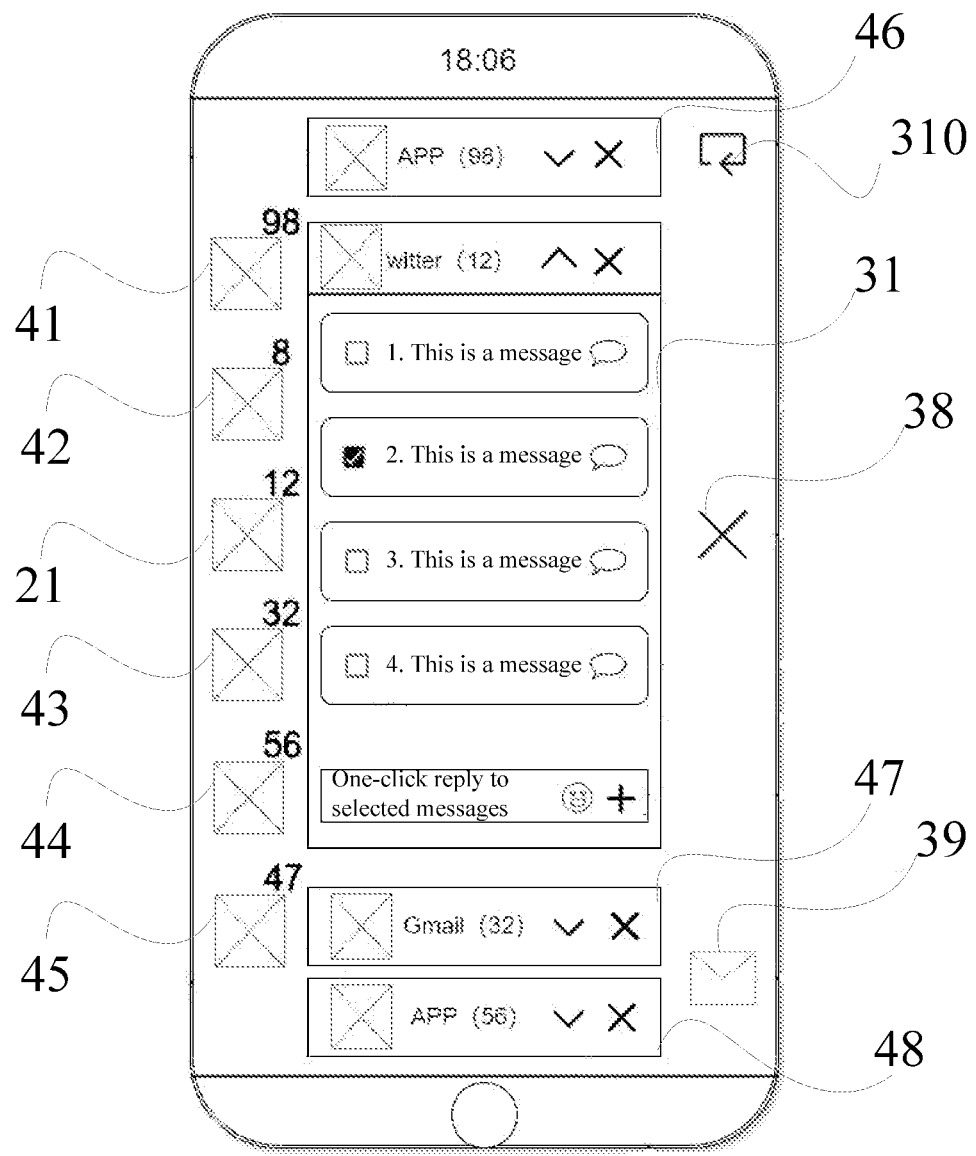
FIG. 4 is a second schematic diagram of an application scenario of a message processing method according to an embodiment of the present application.

As shown in FIG. 3, the application program Twitter is taken as an example for illustration. After the user clicks the corner mark of Twitter, a message window 31 of Twitter is displayed in a display interface, for example, in this message window 31, unread messages of Twitter are arranged vertically, and icons (icons 32, 33, 34, 35 in FIG. 3) of other application programs with unread messages and icons 21 of Twitter are arranged horizontally, and the unread messages of Twitter are displayed in an expanded state (as message window 31 in FIG. 3), the unread messages of the application program before or after Twitter are displayed in a closed state (windows 36, 37 in FIG. 3). Alternatively, as shown in FIG. 4, unread messages are arranged vertically in the message window 31 of Twitter, and icons of other application programs with unread messages (icons 41, 42, 43, 44, 45 in FIG. 4) and icon 21 of Twitter are arranged vertically, and the unread messages of Twitter are displayed in an expanded state (as message window 31 in FIG. 4), and the unread messages of the application program before or after Twitter are displayed in a closed state (windows 46, 47, and 48 in FIG. 4).

Optionally, after displaying the first unread message in response to the first input, at least one of the following items is further included.

A second input performed on a first target unread message is received, and in response to the second input, the first target unread message is set to a locked state; where the locked state is a state that the unread message remains unread, and the first target unread message is at least one first unread message.

Figure 5:
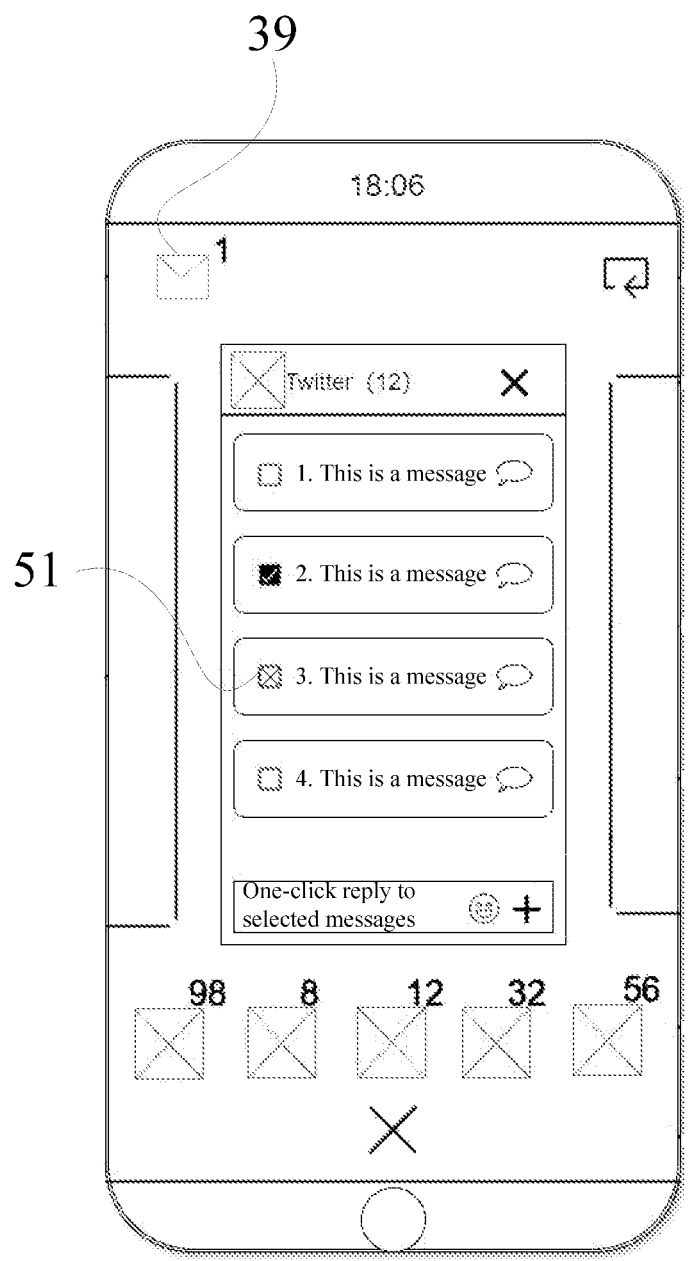
FIG. 5 is a third schematic diagram of an application scenario of a message processing method according to an embodiment of the present application.

In an embodiment of the present application, the second input may be a sliding input for sliding the unread message to the left. For example, after the user slides the first target unread message to the left, the first target unread message is moved into a temporary storage region and locked, and number display of a corner mark of a temporary storage region button 39 is updated, as shown in FIG. 5. The second input may also be a selection input performed on the first target unread message. For example, the user clicks any one or more unread messages, and a selection window pops up, the first target unread message can be selected through the selection window, and the first target unread message can be locked, and number display of the corner mark of the temporary storage region button 39 can be updated.

Herein, the locked state means that the first target unread message can be set to the read state, or the first target unread message can be removed or deleted only after unlock. At the same time, when displaying unread messages, locked messages can be marked with colors or symbols different from unlocked messages. For example, in FIG. 5, the third unread message in unread messages of Twitter is a locked message, which can be marked with a "cross" mark 51, green or red or other colors, to differentiate from unlocked unread messages.

In this embodiment, a temporary storage region for unread messages is set, and messages with high importance may be classified in a distinguished manner. For example, the user can choose to lock and mark messages with high importance, that is, store them in the unread message temporary storage region, so that the user can choose to delete the unread messages with low importance with one click (that is, unread messages not stored in the unread message temporary storage region), and this does not affect the viewing and reply of unread messages in the temporary storage region, making unread message processing faster and more reasonable, improving the efficiency of unread message processing, and giving users better experience.

A third input performed on a second target unread message is received, and in response to the third input, the second target unread message is set to a read state and the second target unread message is removed from the displayed first unread message; where the second target unread message is at least one first unread message.

Herein, the third input may be a sliding input for sliding to the right. For example, if the user slides an unread message to the right, the unread message is set as read, and is removed from the displayed first unread message, and number display of the corner mark of the application program corresponding to the first icon is updated. The third input can also be the input of long pressing the unread message, and then a selection window pops up to select the message as read, then at least one of the unread messages is set as read and removed from the displayed first unread message, and the number display of the corner mark of the application program corresponding to the first icon is updated.

In this embodiment, one or a batch of unread messages can be quickly removed, the operation is more convenient, the efficiency of unread message processing is improved, and better user experience is provided to the user.

A fourth input performed on a third target unread message is received, and in response to the fourth input, a message reply window corresponding to the third target unread message is displayed; where the third target unread message is at least one first unread message.

Figure 6:
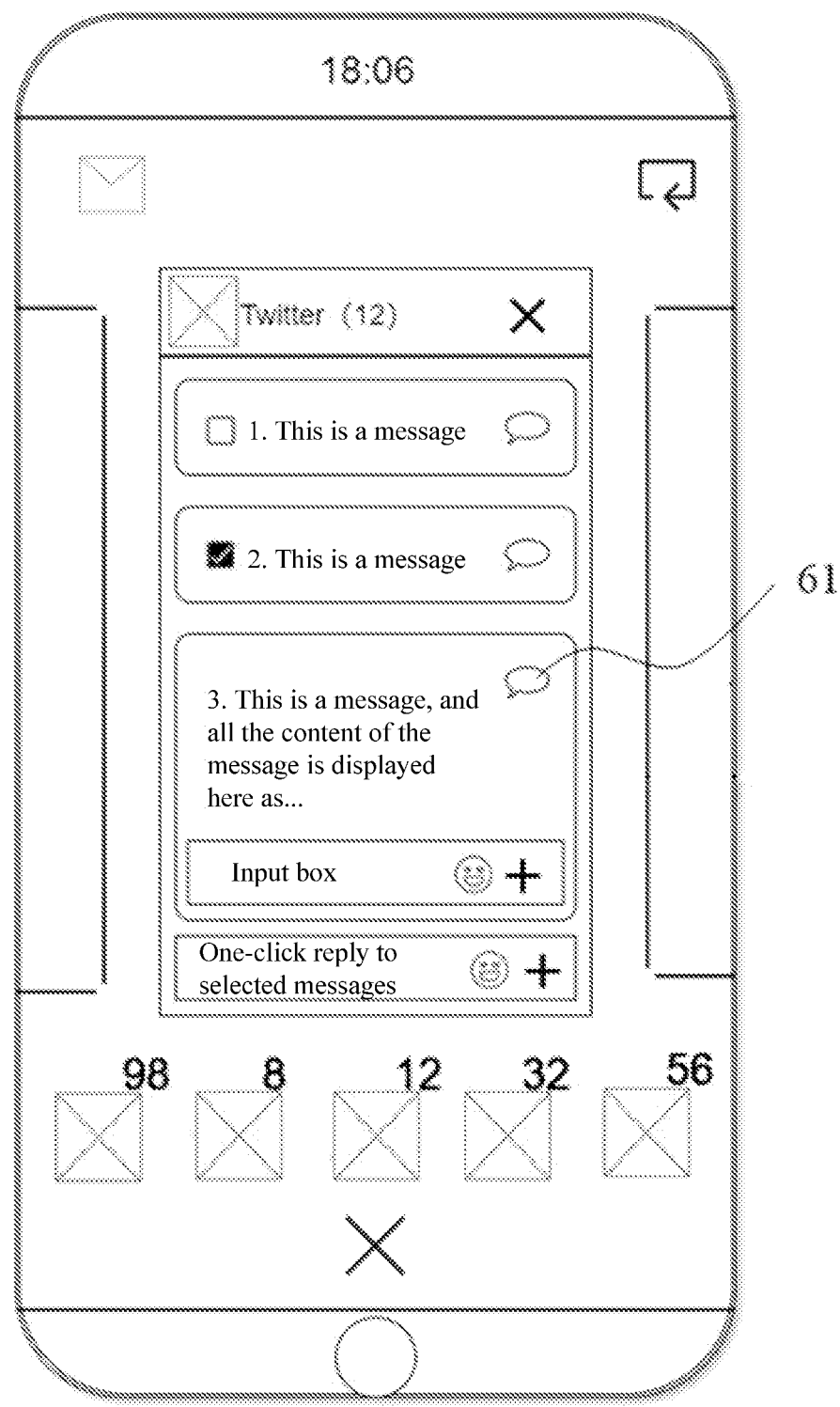
FIG. 6 is a fourth schematic diagram of an application scenario of a message processing method according to an embodiment of the present application.

Herein, the third target unread message is an unread message corresponding to an application program that needs to be replied, for example, a communication social application program such as SMS, WeChat, or Weibo. As shown in FIG. 6, when the user clicks a reply button 61 of the unread message, the content and input box of the unread message pops up, and the unread message can be quickly replied. Optionally, after the reply is completed, the unread message can be removed from the displayed first unread message.

It should be noted that to fast reply to the unread message, the terminal needs to access a system programming interface of the application program. In this way, messages that need to be replied can be quickly replied without entering the application program, which improves the efficiency of unread message processing and provides users with better experience.

In the embodiments of this application, by adding the click interaction on the corner mark of the application program, the message window pops up and the message can be quickly viewed, replied, and removed, and by sliding or clicking on the unread message, the unread message can be quickly locked, replied, and deleted, and unread messages of different importance can also classified, making unread message processing easier and faster, improving the efficiency of unread message processing, and providing users better experience.

Optionally, after displaying the first unread message in response to the first input, the method further includes:
receiving a ninth input; and
control the target display mode to switch between a first display mode and a second display mode in response to the ninth input;
where in the first display mode, at least one second icon is arranged horizontally, and at least one message window is arranged horizontally; and
in the second display mode, at least one second icon is arranged vertically, and at least one message window is arranged vertically.

As shown in FIG. 3, the first display mode may include at least one second icon (such as icons 32, 33, 21, 34, and 35 in FIG. 3) arranged horizontally, and at least one message window (such as the windows 31, 36, and 37 in FIG. 3) arranged horizontally. Optionally, the first display mode may further include a first removing button 38 arranged at a lower end of the interface, and a temporary storage region button 39 and a switching button 310 arranged at an upper end of the interface.

As shown in FIG. 4, the second display mode may include at least one second icon (such as icons 41, 42, 21, 43, 44, and 45 in FIG. 4) arranged vertically, and at least one message window (such as the windows 31, 46, 47, and 48 in FIG. 4) arranged vertically. Optionally, the second display mode may further include a first removing button 38, a temporary storage region button 39, and a switching button 310 arranged on one side of the interface.

Optionally, the first removing button 38 is configured to remove unread messages of all application programs with one click (that is, mark the unread messages of all application programs as read or delete, etc.); the temporary storage region button 39 is configured to display unread messages in the temporary storage region; and the switch button 310 is configured to switch the target display mode to the first display mode or the second display mode, etc.

Optionally, the ninth input may be a click input on the switching button 310, and when the switching button 310 is clicked, the interface may switch from the first display mode to the second display mode, or switch from the second display mode to the first display mode.

Optionally, for the above two display modes, one of the display modes can be set as the default display mode according to the user's habits. At the same time, through the quick switching of the two display modes, the user's operation speed can be improved and the usage habits of different users can be satisfied.

Optionally, after displaying the first unread message in response to the first input, at least one of the following items is further included.

A first sliding input is received, and in response to the first sliding input, update is performed to display a second message window; where the second message window is used to display unread messages of an application program corresponding to a first target icon, and an arrangement order of the first target icon in the second icon(s) is after the first icon.

Herein, the first sliding input can be an input of sliding to the left or upward. As shown in FIG. 3, in the first display mode, a current message window is the message window of Twitter, and if sliding to the left, the currently displayed message window is switched from the message window of Twitter to a message window of an application program after Twitter. For example, in FIG. 3, a mailbox icon 34 is located behind the icon 21 of Twitter, and then the first sliding input for sliding to the left is used to update to display the message window of the mailbox. As shown in FIG. 4, in the second display mode, a current message window is the message window of Twitter, and if sliding upwards, the currently displayed message window is switched from the message window of Twitter to a message window of an application program after Twitter. For example, in FIG. 4, a mailbox icon 43 is located behind the icon 21 of Twitter, and then the first sliding input for sliding to upwards is used to update to display the message window of the mailbox.

In this way, display switching of unread messages of different application programs can be quickly realized through the first sliding input, which is easy to operate and provides better user experience for users.

A second sliding input is received, and in response to the second sliding input, update is performed to display a third message window; where the third message window is used to display unread messages of an application program corresponding to a second target icon, and an arrangement order of the second target icon in the second icon(s) is before the first icon.

Herein, the second sliding input can be an input for sliding to the right or downward. As shown in FIG. 3, in the first display mode, a current message window is the message window of Twitter, and if sliding to the right, the currently displayed message window is switched from the message window of Twitter to a message window of an application program before Twitter. For example, in FIG. 3, a browser icon 33 is located before the icon 21 of Twitter, and then the second sliding input for sliding to the right is used to update to display the message window of the browser. As shown in FIG. 4, in the second display mode, a current message window is the message window of Twitter, and if sliding downwards, the currently displayed message window is switched from the message window of Twitter to a corresponding message window of an application program before Twitter. For example, in FIG. 4, a browser icon 42 is located before the icon 21 of Twitter, and then the second sliding input for sliding to downwards is used to update to display the message window of the browser.

In this way, display switching of unread messages of different application programs can be quickly realized through the second sliding input, which is easy to operate and provides better user experience for users.

A fifth input performed on a third target icon is received, and in response to the fifth input, update is performed to display a fourth message window, where the fourth message window is used to display unread messages of an application program corresponding to the third target icon.

Herein, the fifth input can be a click input. By clicking any second icon, the current message window is switched to the second icon. For example, as shown in FIG. 3, the icon of mailbox 34 is clicked, and the current message window is switched from displaying unread messages of Twitter 31 in an expanded state to displaying unread messages of mailbox 34 in an expanded state.

In this way, display switching of unread messages of any different application programs can be quickly realized by performing a clicking input, the operation is simple, the efficiency of unread message processing is improved, and better user experience is provided to users.

Optionally, after displaying the first unread message in response to the first input, at least one of the following items is further included.

A sixth input performed on a removing button is received, and in response to the sixth input, unread messages of all application programs in the target display mode is set to a read state, and the target display mode is exited.

As shown in FIG. 3 or FIG. 4, the sixth input can be an input of clicking the first removing button 38, and then the unread messages of all application programs in the target display mode are marked as read, and the display mode is exited.

In this embodiment, all unread messages that are not locked can be removed with one click, and therefore this is quick and differentiated processing is performed for unread messages with high importance, to improve the efficiency of unread message processing, and make batch processing of unread messages faster and more reasonable.

A seventh input performed on the target message window is received, and in response to the seventh input, an unread message in the target message window is set to a read state, and a second icon of an application program corresponding to the target message window is deleted; where the target message window is at least one of the at least one message window.

As shown in FIG. 3, the seventh input can be an input of clicking the second removing button 311, then all unread messages of an application program corresponding to the second removing button 311 are set as read, the second icon corresponding to the application program is deleted, and the message window is updated to a next application program of the application program corresponding to the first icon in the target display mode. For example, when clicking the second removing button 311 of the message window 31 of Twitter, all unlocked unread messages in the message window 31 of Twitter are marked as read, and update is performed to display unread messages of the mailbox application program corresponding to the mailbox icon 34 behind the icon 21 of Twitter.

In this embodiment, all unread messages of the target application program that are not locked can be removed with one click, and therefore this is quick and differentiated processing is performed for unread messages with high importance, to improve the efficiency of unread message processing, and make batch processing of unread messages faster and more reasonable.

Optionally, after displaying the first unread message in response to the first input, the method further includes:
  receiving an eighth input; and
  in response to the eighth input, controlling the message window to display only an unread message in a locked state; where the locked state is a state in which an unread message remains unread.

Figure 7:
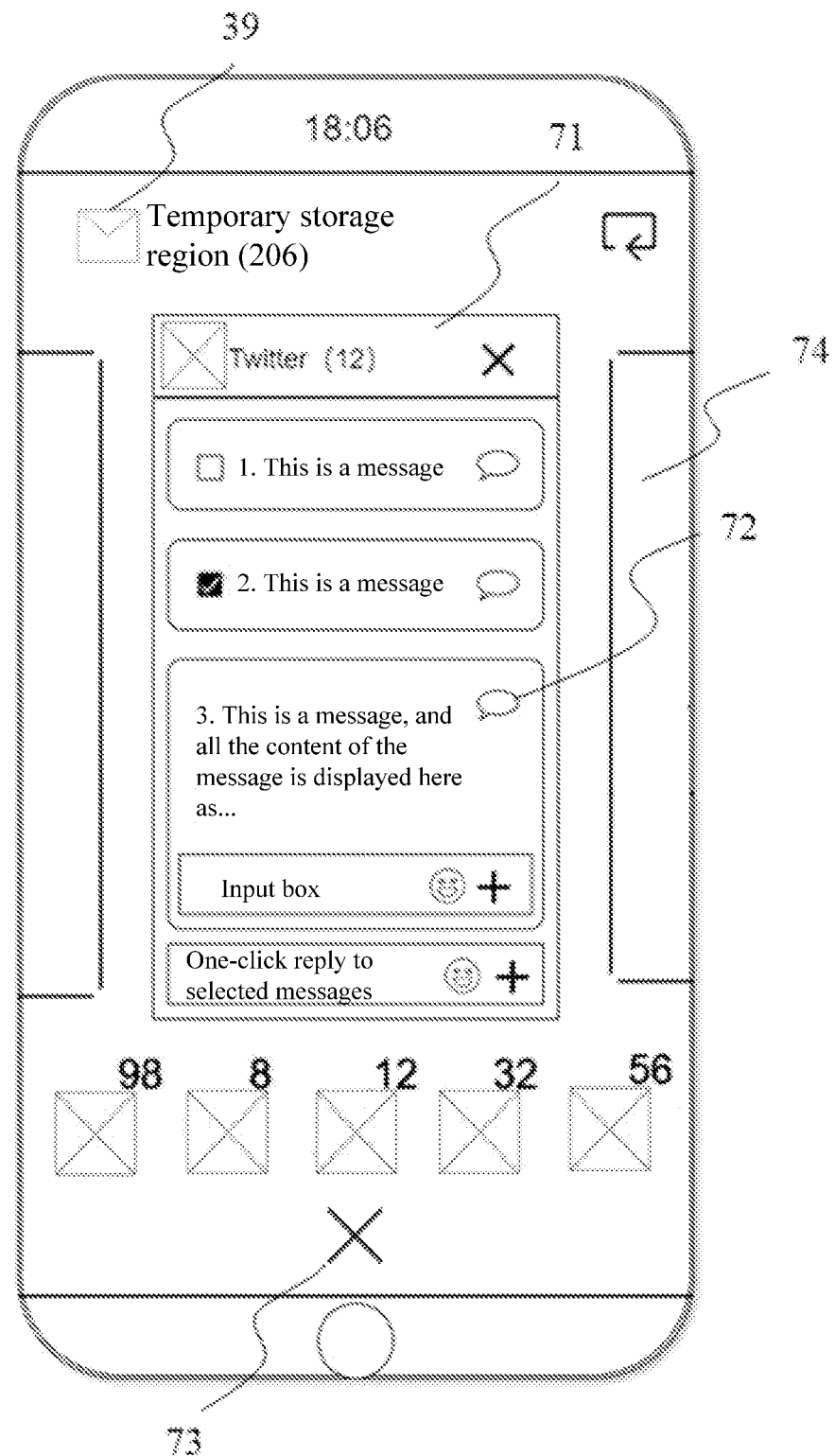
FIG. 7 is a fifth schematic diagram of an application scenario of a message processing method according to an embodiment of the present application.

As shown in FIG. 7, the eighth input can be an input of clicking the temporary storage region button 39, and then the message window displays locked unread messages in a vertical arrangement, for example, the message window 71 of Twitter, and different application programs are classified. The locked state is a state that cannot be marked as read if it is not unlocked. After the locked unread message is displayed, a reply button 72 can be clicked to reply to the unread message corresponding to the reply button 72. After the reply, the unread message is marked as read, and the message can be deleted from the temporary storage region, and the corner mark number of the temporary storage region button 39 is updated; or the first removing button 73 can be clicked, then all the locked unread messages of an application program are all marked as read, the current display mode is exited, and the corner mark number of the temporary storage region button 39 is updated; or the second removing button 74 can be clicked, then all locked unread messages of the application program corresponding to the second removing button 74 are set to read, and the second icon of the application program corresponding to the application program is deleted, the message window is updated to the next application program of the application program corresponding to the first icon in the target display mode, and the corner mark number of the temporary storage region button 39 is updated; or a target message may be slided to the left or the right, then the target message is marked as read, and a corner mark number of a region identification button 39 is updated. For example, a message window 71 of Twitter is slided to the left or right, then all locked unread messages corresponding to the message window 71 of Twitter are set as read, the Twitter icon is deleted, and the message window is updated to the next application program, for example, mailbox 74, of the application program corresponding to the icon 71 of Twitter in the target display mode.

Figure 8:
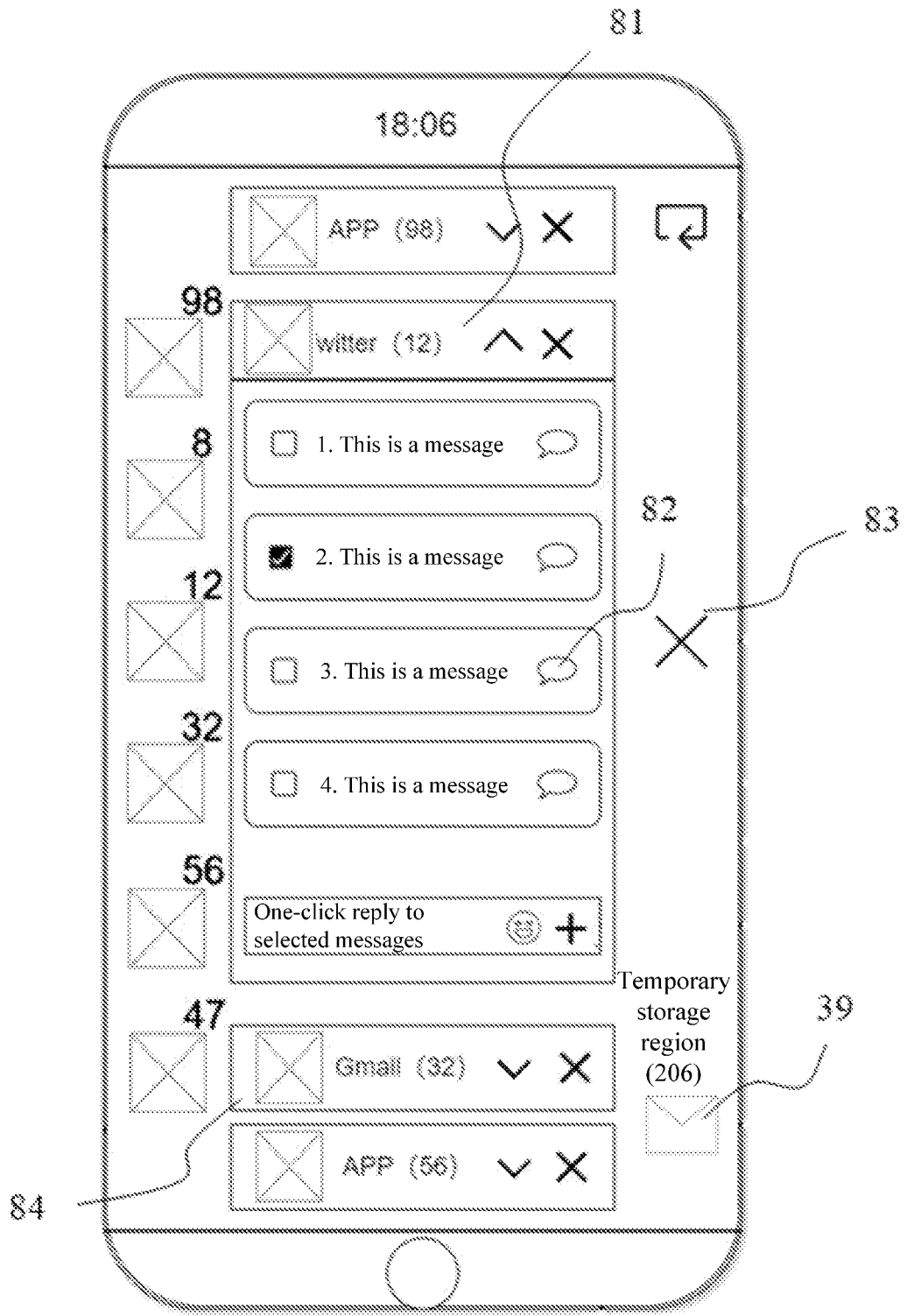
FIG. 8 is a sixth schematic diagram of an application scenario of a message processing method according to an embodiment of the present application.

As shown in FIG. 8, the eighth input can be an input of clicking the temporary storage region button 39, and then the message window displays locked unread messages in a vertical arrangement, for example, Twitter 81, and different application programs are classified. The locked state is a state that cannot be marked as read if it is not unlocked. After the locked unread message is displayed, a reply button 82 can be clicked to reply to the unread message corresponding to the reply button 82. After the reply, the unread message is marked as read, and the message can be deleted from the temporary storage region, and the corner mark number of the temporary storage region button 39 is updated; or the first removing button 83 can be clicked, then all the locked unread messages of an application program are all marked as read, the current display mode is exited, and the corner mark number of the temporary storage region button 39 is updated; or the second removing button 84 can be clicked, then all locked unread messages of the application program corresponding to the second removing button 84 are set to read, and the second icon of the application program corresponding to the application program is deleted, the message window is updated to the next application program of the application program corresponding to the first icon in the target display mode, and the corner mark number of the temporary storage region button 39 is updated; or a target message may be slided upward or downward, then the message is marked as read, and a corner mark number of the temporary storage region button 39 is updated. For example, Twitter 81 is slided upward or downward, then all locked unread messages corresponding to Twitter 81 are set as read, and the icon of Twitter 81 is deleted, the message window is updated to a next application program, such as mailbox 84, of the application corresponding to the icon of Twitter 81 in the target display mode.

In this embodiment, a temporary storage region for unread messages is set, and messages with high importance may be classified in a distinguished manner. For example, the user can choose to lock and mark messages with high importance, that is, store them in the unread message temporary storage region, so that the user can choose to delete the unread messages with low importance with one click (that is, unread messages not stored in the unread message temporary storage region), and this does not affect the viewing and reply of unread messages in the temporary storage region, making unread message processing faster and more reasonable, improving the efficiency of unread message processing, and giving users better experience. At the same time, you can quickly view, reply, and delete unread messages in the temporary storage region.

It should be noted that, the message processing method provided in the embodiment of the present application may be performed by a message processing apparatus, or a control module in the message processing apparatus for executing the message processing method. In the embodiments of the present application, an example in which the message processing apparatus performs the message processing method is used to describe the message processing apparatus provided in the embodiments of the present application.

Figure 9:
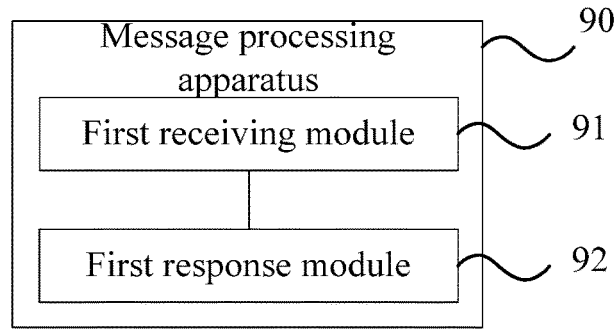
FIG. 9 is a schematic diagram of modules of a message processing apparatus according to an embodiment of the present application.

As shown in FIG. 9, the embodiments of the present application further provide a message processing apparatus 90, including:
a first receiving module 91, configured to receive a first input performed on a target region on a first icon; where the target region includes a corner mark associated with a first unread message, and the first unread message includes at least one unread message of an application program corresponding to the first icon; and
a first response module 92, configured to display the first unread message in response to the first input.

Optionally, the first response module is further configured to:
display the first unread message in a target display mode in response to the first input;
where at least one message window and second icon(s) of at least one application program with unread messages are displayed in the target display mode, a first message window in the at least one message window is used to display the first unread message, and at least one second icon includes the first icon.

Optionally, the message processing apparatus 90 further includes at least one of the following:
a second receiving module, configured to receive a second input performed on a first target unread message, and set the first target unread message to a locked state in response to the second input; where the locked state is a state that the unread message remains unread, and the first target unread message is at least one first unread message;
a third receiving module, configured to receive a third input performed on a second target unread message, and in response to the third input, set the second target unread message to a read state and remove the second target unread message from the displayed first unread message; where the second target unread message is at least one first unread message; or
a fourth receiving module, configured to receive a fourth input performed on a third target unread message, and in response to the fourth input, display a message reply window corresponding to the third target unread message; where the third target unread message is at least one first unread message.

Optionally, the message processing apparatus 90 further includes:
an eleventh receiving module, configured to receive a ninth input; and
a second response module, configured to control the target display mode to switch between a first display mode and a second display mode in response to the fifth input;
where in the first display mode, at least one second icon is arranged horizontally, and at least one message window is arranged horizontally; and
in the second display mode, at least one second icon is arranged vertically, and at least one message window is arranged vertically.

Optionally, the message processing apparatus 90 further includes at least one of the following:
a fifth receiving module, configured to receive a first sliding input, and update to display a second message window in response to the first sliding input; where the second message window is used to display unread messages of an application program corresponding to a first target icon, and an arrangement order of the first target icon in the second icon(s) is after the first icon;
a sixth receiving module, configured to receive a second sliding input, and in response to the second sliding input, update to display a third message window; where the third message window is used to display unread messages of an application program corresponding to a second target icon, and an arrangement order of the second target icon in the second icon(s) is before the first icon; or a seventh receiving module, configured to receive a fifth input performed on a third target icon, and in response to the fifth input, update to display a fourth message window, where the fourth message window is used to display unread messages of an application program corresponding to the third target icon.

Optionally, the message processing apparatus 90 further includes at least one of the following:

an eighth receiving module, configured to receive a sixth input performed on a removing button, and in response to the sixth input, set unread messages of all application programs in the target display mode to a read state, and exit the target display mode; or a ninth receiving module, configured to receive a seventh input performed on the target message window, and in response to the seventh input, set an unread message in the target message window to a read state, and delete a second icon of an application program corresponding to the target message window; where the target message window is at least one of the at least one message window.

Optionally, the message processing apparatus 90 further includes:

a tenth receiving module, configured to receive an eighth input; and a third response module, configured to: in response to the eighth input, control the message window to display only an unread message in a locked state; where the locked state is a state in which an unread message remains unread.

The message processing apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like. The non-mobile electronic device may be a server, a Network Attached Storage (NAS), a Personal Computer (PC), a television (TV), a teller machine, a self-service machine, or the like. This is not limited in the embodiments of this application.

The message processing apparatus in the embodiments of the present application may be an apparatus with an operating system. The operating system may be an Android operating system, an iOS operating system, or another possible operating system, which is not limited in the embodiments of this application.

The message processing apparatus provided in this embodiment of the present application can implement processes implemented by the message processing apparatus in the method embodiments of FIG. 1 to FIG. 8. To avoid repetition, details are not described herein again.

The message processing apparatus 90 in the embodiments of the present application receives the first input performed on the target region that is on the first icon and that includes the corner mark associated with the first unread message; and displays the first unread message in response to the first input, to quickly view unread messages. In this way, the unread messages are displayed by adding the click interaction on the corner mark of the application program, making the unread message processing easier and faster and improving the efficiency of unread message processing.

Figure 10:
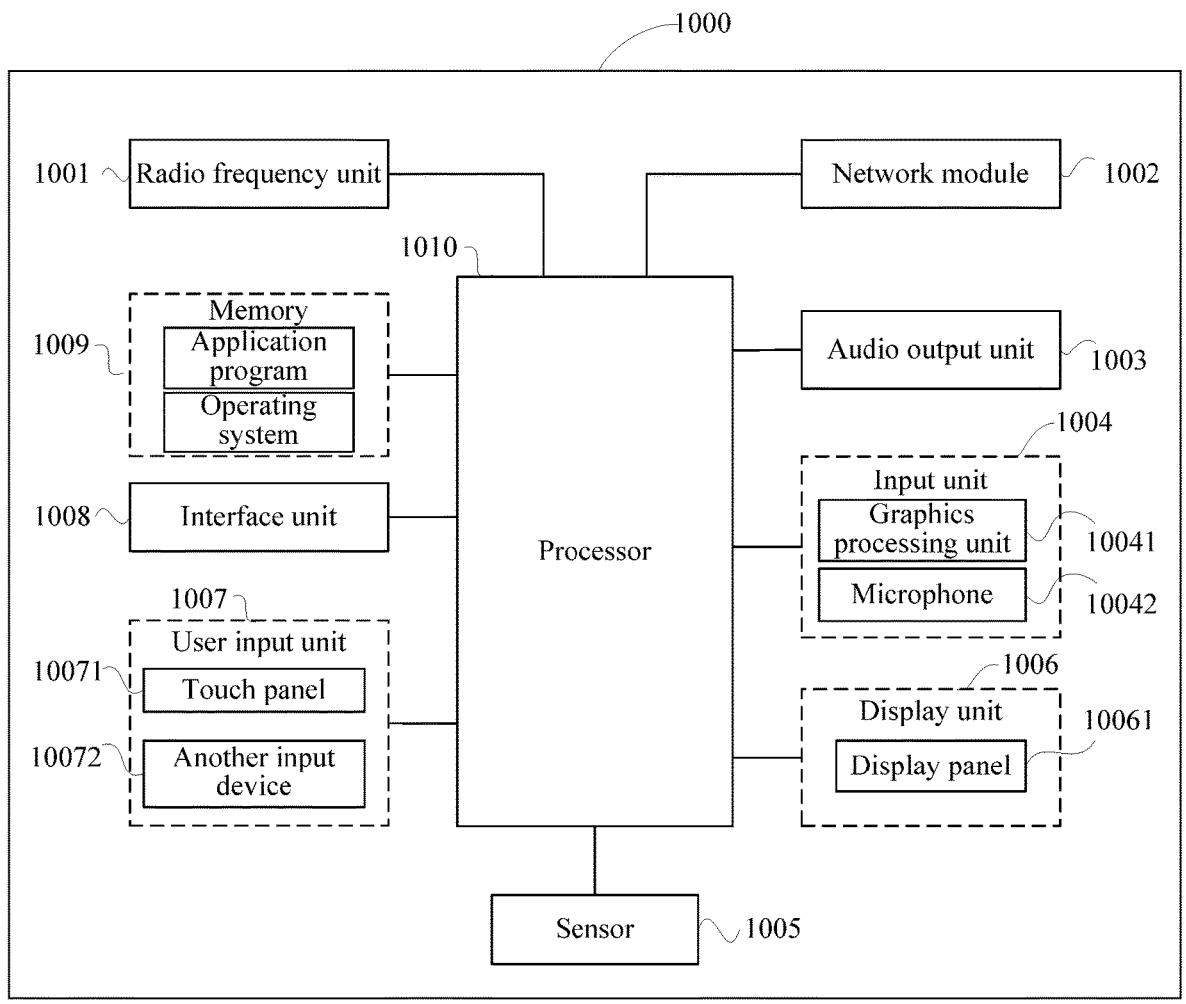
FIG. 10 is a schematic structural diagram of hardware of an electronic device according to an embodiment of the present application.

FIG. 10 is a schematic diagram of a hardware structure of an electronic device for implementing embodiments of this application.

The electronic device 1000 includes, but is not limited to: a radio frequency unit 1001, a network module 1002, an audio output unit 1003, an input unit 1004, a sensor 1005, a display unit 1006, a user input unit 1007, an interface unit 1008, a memory 1009, a processor 1010, etc.

Those skilled in the art can understand that the electronic device 1000 may further include the power supply supplying power to each component. Preferably, the power supply may be logically connected to the processor 1010 by using a power management system, so as to implement functions such as charging management, discharging management and power consumption management by using the power management system. A structure of the electronic device shown in FIG. 10 does not constitute a limitation on the electronic device, and may include more or fewer parts than those shown in the figure, or combine some components, or have different part arrangements. Details are not described herein again.

The user input unit 1007 is configured to receive a first input performed on a target region on a first icon; where the target region includes a corner mark associated with a first unread message the first unread message includes at least one unread message of an application program corresponding to the first icon.

The processor 1010 is configured to display the first unread message through the display unit 1006 in response to the first input.

Optionally, the processor 1010 is configured to display the first unread message in a target display mode through the display unit 1006 in response to the first input; where at least one message window and second icon(s) of at least one application program with unread messages are displayed in the target display mode, a first message window in the at least one message window is used to display the first unread message, and at least one second icon includes the first icon.

Optionally, the user input unit 1007 is configured to receive a second input performed on the first target unread message.

The processor 1010 is configured to set the first target unread message to a locked state in response to the second input; where the locked state is a state that the unread message remains unread, and the first target unread message is at least one first unread.

Optionally, the user input unit 1007 is configured to receive a third input performed on the second target unread message.

The processor 1010 is configured to: in response to the third input, set the second target unread message to a read state and remove the second target unread message from the displayed first unread message; where the second target unread message is at least one first unread message.

Optionally, the user input unit 1007 is configured to receive a fourth input performed on a third target unread message.

The processor 1010 is configured to: in response to the fourth input, display a message reply window corresponding to the third target unread message through the display unit 1006; where the third target unread message is at least one first unread message.

Optionally, the user input unit 1007 is configured to receive a first sliding input.

The processor 1010 is configured to update to display a second message window through the display unit 1006 in response to the first sliding input; where the second message window is used to display unread messages of an application program corresponding to a first target icon, and an arrangement order of the first target icon in the second icon(s) is after the first icon.

Optionally, the user input unit 1007 is configured to receive a second sliding input.

The processor 1010 is configured to: in response to the second sliding input, update to display a third message window through the display unit 1006; where the third message window is used to display unread messages of an application program corresponding to a second target icon, and an arrangement order of the second target icon in the second icon(s) is before the first icon.

Optionally, the user input unit 1007 is configured to receive a fifth input performed on a third target icon.

The processor 1010 is configured to: in response to the fifth input, update to display a fourth message window through the display unit 1006, where the fourth message window is used to display unread messages of an application program corresponding to the third target icon.

Optionally, the user input unit 1007 is configured to receive a sixth input performed on a removing button.

The processor 1010 is configured to: in response to the sixth input, set unread messages of all application programs in the target display mode to a read state, and exit the target display mode.

Optionally, the user input unit 1007 is configured to receive a seventh input performed on a target message window.

The processor 1010 is configured to: in response to the seventh input, set an unread message in the target message window to a read state, and delete a second icon of an application program corresponding to the target message window; where the target message window is at least one of the at least one message window.

Optionally, the user input unit 1007 is configured to receive an eighth input.

The processor 1010 is configured to: in response to the eighth input, control the message window to display only an unread message in a locked state; where the locked state is a state in which an unread message remains unread.

Optionally, the user input unit 1007 is configured to receive a ninth input.

The processor 1010 is configured to control the target display mode to switch between a first display mode and a second display mode in response to the ninth input;

where in the first display mode, at least one second icon is arranged horizontally, and at least one message window is arranged horizontally; and in the second display mode, at least one second icon is arranged vertically, and at least one message window is arranged vertically.

The electronic device 1000 in the embodiments of the present application receives the first input performed on the target region that is on the first icon and that includes the corner mark associated with the first unread message; and displays the first unread message in response to the first input, to quickly view unread messages. In this way, the unread messages are displayed by adding the click interaction on the corner mark of the application program, making the unread message processing easier and faster and improving the efficiency of unread message processing.

It should be understood that, in the embodiments of this application, the input unit 1004 may include a Graphics Processing Unit (GPU) 10041 and a microphone 10042, and the graphics processing unit 10041 processes image data of a still picture or video obtained by an image capture apparatus (such as a camera) in a video capture mode or an image capture mode. The display unit 1006 may include a display panel 10061. The display panel 10061 may be configured in a form such as a liquid crystal display or an organic light-emitting diode. The user input unit 1007 includes a touch panel 10071 and another input device 10072. The touch panel 10071 is also called a touch screen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein. The memory 1009 may be configured to store a software program and various data, including but not limited to an application program and an operating system. The processor 1010 may be integrated with an application processor and a modem processor. The application processor mainly processes an operating system, a user interface, an application program, and the like, and the modem processor mainly processes wireless communication. It can be understood that, alternatively, the modem processor may not be integrated into the processor 1010.

Figure 11:
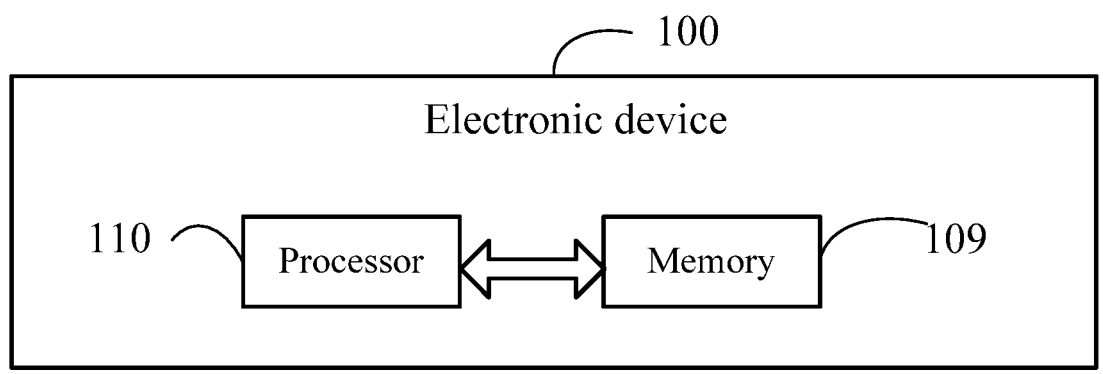
FIG. 11 is a schematic structural diagram of an electronic device according to an embodiment of the present application.

Optionally, as shown in FIG. 11, the embodiments of the present application further provide an electronic device 100, including a processor 110, a memory 109, and a program or an instruction stored in the memory 109 and executable on the processor 110. When the program or instruction is executed by the processor 110, the various processes of the foregoing message processing method embodiments can be achieved, and the same technical effect can be achieved. To avoid repetition, details are not repeated herein.

It should be noted that the electronic device in this embodiment of this application includes the foregoing mobile electronic device and the foregoing non-mobile electronic device.

An embodiment of the present application further provides a non-transitory computer-readable storage medium. The non-transitory computer-readable storage medium stores a program or an instruction, and when the program or the instruction is executed by a processor, the various processes of the foregoing message processing method embodiment is performed and the same technical effects can be achieved. To avoid repetition, details are not described herein again.

The processor is a processor in the electronic device in the foregoing embodiment. The non-transitory computer-readable storage medium includes a computer Read-Only Memory (ROM), a Random Access Memory (RAM), a magnetic disk, an optical disc, or the like.

An embodiment of the present application further provides a chip, the chip includes a processor and a communication interface, the communication interface is coupled to the processor, and the processor is configured to execute a program or instructions to implement the various processes of the foregoing message processing method embodiment and the same technical effects can be achieved. To avoid repetition, details are not described herein again.

It should be understood that the chip mentioned in this embodiment of this application may also be referred to as a system-level chip, a system chip, a chip system, or a system on a chip.

The embodiments of the present application further provide a computer program product, the computer program product is stored in a non-volatile storage medium, and the computer program product is executed by at least one processor to implement the various processes of the message processing method embodiments, and the same technical effects can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing implementations. The foregoing implementations are merely examples, but are not limiting. A person of ordinary skill in the art may make many forms without departing from the objective and the scope of the claims of this application, and these forms all fall within the protection scope of this application.

What is claimed is:

1. A message processing method, comprising:
    receiving a first input performed on a target region on a first icon;
    wherein the target region comprises a corner mark associated with a first unread message, and the first unread message comprises at least one unread message of an application program corresponding to the first icon; and
    displaying the first unread message in response to the first input; wherein
    the displaying the first unread message in response to the first input comprises:
    displaying the first unread message in a target display mode in response to the first input;
    wherein at least one message window and second icon(s) of at least one application program with unread messages are displayed in the target display mode, a first message window in the at least one message window is used to display the first unread message, and at least one second icon comprises the first icon; unread messages in the first message window are displayed in an expanded state, and unread messages in a message window before or after the first message window in the at least one message window are displayed in a closed state.

2. The message processing method according to claim 1, after displaying the first unread message in response to the first input, further comprising at least one of the following:
    receiving a second input performed on a first target unread message, and setting the first target unread message to a locked state in response to the second input; wherein the locked state is a state that an unread message remains unread, and the first target unread message is at least one first unread message;
    receiving a third input performed on a second target unread message, and in response to the third input, setting the second target unread message to a read state and removing the second target unread message from displayed first unread message; wherein the second target unread message is at least one first unread message; or
    receiving a fourth input performed on a third target unread message, and in response to the fourth input, displaying a message reply window corresponding to the third target unread message; wherein the third target unread message is at least one first unread message.

3. The message processing method according to claim 1, after displaying the first unread message in response to the first input, further comprising at least one of the following:
    receiving a first sliding input, and in response to the first sliding input, updating to display a second message window; wherein the second message window is used to display unread messages of an application program corresponding to a first target icon, and an arrangement order of the first target icon in the second icon(s) is after the first icon;
    receiving a second sliding input, and in response to the second sliding input, updating to display a third message window; wherein the third message window is used to display unread messages of an application program corresponding to a second target icon, and an arrangement order of the second target icon in the second icon(s) is before the first icon; or
    receiving a fifth input performed on a third target icon, and in response to the fifth input, updating to display a fourth message window, wherein the fourth message window is used to display unread messages of an application program corresponding to the third target icon.

4. The message processing method according to claim 1, after displaying the first unread message in response to the first input, further comprising at least one of the following:
    receiving a sixth input performed on a removing button, and in response to the sixth input, setting unread messages of all application programs in the target display mode to a read state, and exiting the target display mode; or
    receiving a seventh input performed on a target message window, and in response to the seventh input, setting an unread message in the target message window to a read state, and deleting a second icon of an application program corresponding to the target message window; wherein the target message window is at least one of the at least one message window.

5. The message processing method according to claim 1, after the displaying the first unread message in response to the first input, further comprising:

receiving an eighth input; and in response to the eighth input, controlling the message window to display only an unread message in a locked state; wherein the locked state is a state in which an unread message remains unread.

6. An electronic device, comprising a processor, a memory, and a program or an instruction stored in the memory and executable on the processor, wherein the program or instruction, when executed by the processor, causes the electronic device to perform:

receiving a first input performed on a target region on a first icon;

wherein the target region comprises a corner mark associated with a first unread message, and the first unread message comprises at least one unread message of an application program corresponding to the first icon; and displaying the first unread message in response to the first input; wherein the displaying the first unread message in response to the first input comprises:

displaying the first unread message in a target display mode in response to the first input;

wherein at least one message window and second icon(s) of at least one application program with unread messages are displayed in the target display mode, a first message window in the at least one message window is used to display the first unread message, and at least one second icon comprises the first icon; unread messages in the first message window are displayed in an expanded state, and unread messages in a message window before or after the first message window in the at least one message window are displayed in a closed state.

7. The electronic device according to claim 6, wherein the program or instruction, when executed by the processor, causes the electronic device to further perform at least one of the following:

receiving a second input performed on a first target unread message, and setting the first target unread message to a locked state in response to the second input; wherein the locked state is a state that an unread message remains unread, and the first target unread message is at least one first unread message;

receiving a third input performed on a second target unread message, and in response to the third input, setting the second target unread message to a read state and removing the second target unread message from displayed first unread message; wherein the second target unread message is at least one first unread message; or receiving a fourth input performed on a third target unread message, and in response to the fourth input, displaying a message reply window corresponding to the third target unread message; wherein the third target unread message is at least one first unread message.

8. The electronic device according to claim 6, wherein the program or instruction, when executed by the processor, causes the electronic device to further perform at least one of the following:

receiving a first sliding input, and in response to the first sliding input, updating to display a second message window; wherein the second message window is used to display unread messages of an application program corresponding to a first target icon, and an arrangement order of the first target icon in the second icon(s) is after the first icon;

receiving a second sliding input, and in response to the second sliding input, updating to display a third message window; wherein the third message window is used to display unread messages of an application program corresponding to a second target icon, and an arrangement order of the second target icon in the second icon(s) is before the first icon; or receiving a fifth input performed on a third target icon, and in response to the fifth input, updating to display a fourth message window, wherein the fourth message window is used to display unread messages of an application program corresponding to the third target icon.

9. The electronic device according to claim 6, wherein the program or instruction, when executed by the processor, causes the electronic device to further perform at least one of the following:

receiving a sixth input performed on a removing button, and in response to the sixth input, setting unread messages of all application programs in the target display mode to a read state, and exiting the target display mode; or receiving a seventh input performed on a target message window, and in response to the seventh input, setting an unread message in the target message window to a read state, and deleting a second icon of an application program corresponding to the target message window; wherein the target message window is at least one of the at least one message window.

10. The electronic device according to claim 6, wherein the program or instruction, when executed by the processor, causes the electronic device to further perform:

receiving an eighth input; and in response to the eighth input, controlling the message window to display only an unread message in a locked state; wherein the locked state is a state in which an unread message remains unread.

11. A non-transitory computer-readable storage medium, storing a program or an instruction, wherein the program or instruction, when executed by a processor of an electronic device, causes the electronic device to perform:

receiving a first input performed on a target region on a first icon;

wherein the target region comprises a corner mark associated with a first unread message, and the first unread message comprises at least one unread message of an application program corresponding to the first icon; and displaying the first unread message in response to the first input; wherein the displaying the first unread message in response to the first input comprises:

displaying the first unread message in a target display mode in response to the first input;

wherein at least one message window and second icon(s) of at least one application program with unread messages are displayed in the target display mode, a first message window in the at least one message window is used to display the first unread message, and at least one second icon comprises the first icon; unread messages in the first message window are displayed in an expanded state, and unread messages in a message window before or after the first message window in the at least one message window are displayed in a closed state.

12. The non-transitory computer-readable storage medium according to claim 11, wherein the program or instruction, when executed by the processor, causes the electronic device to further perform at least one of the following:
- receiving a second input performed on a first target unread message, and setting the first target unread message to a locked state in response to the second input; wherein the locked state is a state that an unread message remains unread, and the first target unread message is at least one first unread message;
- receiving a third input performed on a second target unread message, and in response to the third input, setting the second target unread message to a read state and removing the second target unread message from displayed first unread message; wherein the second target unread message is at least one first unread message; or
- receiving a fourth input performed on a third target unread message, and in response to the fourth input, displaying a message reply window corresponding to the third target unread message; wherein the third target unread message is at least one first unread message.

13. The non-transitory computer-readable storage medium according to claim 11, wherein the program or instruction, when executed by the processor, causes the electronic device to further perform at least one of the following:
- receiving a first sliding input, and in response to the first sliding input, updating to display a second message window; wherein the second message window is used to display unread messages of an application program corresponding to a first target icon, and an arrangement order of the first target icon in the second icon(s) is after the first icon;
- receiving a second sliding input, and in response to the second sliding input, updating to display a third message window; wherein the third message window is used to display unread messages of an application program corresponding to a second target icon, and an arrangement order of the second target icon in the second icon(s) is before the first icon; or
- receiving a fifth input performed on a third target icon, and in response to the fifth input, updating to display a fourth message window, wherein the fourth message window is used to display unread messages of an application program corresponding to the third target icon.

14. The non-transitory computer-readable storage medium according to claim 11, wherein the program or instruction, when executed by the processor, causes the electronic device to further perform at least one of the following:
- receiving a sixth input performed on a removing button, and in response to the sixth input, setting unread messages of all application programs in the target display mode to a read state, and exiting the target display mode; or
- receiving a seventh input performed on a target message window, and in response to the seventh input, setting an unread message in the target message window to a read state, and deleting a second icon of an application program corresponding to the target message window; wherein the target message window is at least one of the at least one message window.

15. The non-transitory computer-readable storage medium according to claim 11, wherein the program or instruction, when executed by the processor, causes the electronic device to further perform:
- receiving an eighth input; and
- in response to the eighth input, controlling the message window to display only an unread message in a locked state; wherein the locked state is a state in which an unread message remains unread.

* * * * *